United States Patent [19]

Vedvik et al.

[11] 3,841,820
[45] Oct. 15, 1974

[54] PACKAGING FORMING APPARATUS

[75] Inventors: Andrew H. Vedvik, Madison; Melvin M. Layman, Waunakee, both of Wis.

[73] Assignee: Oscar Mayer & Co., Inc., Madison, Wis.

[22] Filed: June 15, 1973

[21] Appl. No.: 370,394

[52] U.S. Cl................ 425/388, 53/112 A, 425/342
[51] Int. Cl............................................ B29c 17/04
[58] Field of Search .......... 425/342, 387, 388, 363; 53/112 A, 140, 22 A

[56] References Cited
UNITED STATES PATENTS

| | | | |
|---|---|---|---|
| 3,129,545 | 4/1964 | Sloan et al. | 53/112 A |
| 3,195,288 | 7/1965 | Sloan et al. | 53/140 |
| 3,381,445 | 5/1968 | Vogt | 53/140 |
| 3,518,725 | 7/1970 | Donofrio | 425/388 |
| 3,764,051 | 10/1973 | Pinto et al. | 425/388 X |
| 3,771,938 | 11/1973 | Pinto et al. | 425/292 X |

Primary Examiner—Robert L. Spicer, Jr.
Attorney, Agent, or Firm—Lockwood, Dewey, Zickert & Alex

[57] ABSTRACT

Improved suck-down method and means press a web of deformable packaging film down onto the upper planar surface of each of a series of lower die plates and suck the film into each die cavity therein. Such film suck-down method and means are particularly useful in apparatus for packaging articles between upper and lower webs of packaging film which are rendered temporarily deformable so as to first be deformed into a series of temporarily closed mating die cavities embracing successive articles to be individually packaged. Such apparatus and method are particularly suited to packaging single wieners or other small sausages in individual separable skin-tight envelopes formed of packaging film. The film suck-down method and means involve the use of a multi-sided roll the flat surfaces of which when in their nadir position mate temporarily with the upper surface of a lower die plate and not only press a web of packaging film down onto the planar surface of the mating lower die plate but also apply suction to the die cavity in the mating die plate so as to draw the pressed-down film into conformity with the interior surface of the die cavity.

6 Claims, 11 Drawing Figures

PACKAGING FORMING APPARATUS

The present invention relates generally to innovations and improvements in film handling apparatus and method particularly useful for packaging articles, such as single wieners or other small sausages, in evacuated hermetically sealed skin-tight envelopes formed from upper and lower webs or packaging film when in the temporarily deformable condition. Apparatus and method of this general character for packaging wieners and the like in groups, together with suitable packaging films, are disclosed in U.S. Pat. Nos. 3,083,106; 3,129,545; 3,137,587; 3,189,505; and 3,195,288. While in the foregoing patents the upper and lower webs of packaging film include laminates of saran film initially in the super-cooled or amorphous condition, it will be appreciated that the apparatus and method of the present invention are not limited to use of packaging film formed of saran or laminates of saran but are applicable to other packaging films which can be readily rendered temporarily deformable and sealable, for example under the influence of heat.

Heretofore, as disclosed in the above-identified patents, small sausages such as wieners and Smokie Links have been packaged in flat, side-by-side groups of five, for example, between upper and lower webs of packaging film which by use of the apparatus and methods in the above-mentioned patents form evacuated hermetically sealed envelopes or packages tightly fitting and conforming to such groups of small sausages. While such prior packages of groups of small sausages have been adapted to be partially opened in such manner that the sausages can be removed therefrom one at a time if desired, nevertheless, once the hermetic seal is broken in order to remove one sausage the remaining sausages no longer have the protection that the hermetically sealed envelopes provided.

Accordingly, there has been a requirement for an apparatus and method whereby single small sausages such as wieners or Smokie Links could be economically sealed in individual hermetically sealed envelopes formed of packaging film exhibiting excellent air and oxygen barrier properties.

One object of the invention is the provision of improvements in one unit of the apparatus and one part of the method disclosed in the above-mentioned patents whereby that unit and part are rendered suitable for use in packaging individual articles, specifically small sausages such as wieners and Smokie Links.

A more specific object of the present invention is improved means for and method of pressing a lower or bottom web of packaging film while in the deformable condition down on the top planar surface of a lower die plate provided with a lower die cavity and for sucking or drawing a portion of the film down into the die cavity so as to conform it to the interior thereof.

An important object of the invention is the provision of improved means and method of the character described wherein an overall packaging apparatus and method employs an endless chain of lower die plates having an upper horizontal run presenting a succession of upwardly facing die surfaces having die cavities therein surrounded by generally planar surfaces and a multi-sided roll disposed adjacent the head end of the upper run for rotation about a horizontal axis extending transversely to the direction of travel of the upper run and wherein each of the flat sides or surfaces of the roll when in its nadir position temporarily mates with the upper die surface of a lower die plate so as to press down onto the latter a web of packaging film and at the same time temporarily communicate suction from the roll to the mating die plate so as to apply suction to the die cavity therein and draw the pressed-down film into conformity with the cavity interior.

Certain other objects of a more detailed and specific nature will be apparent from the following description of the presently preferred embodiments of the invention.

For a more complete understanding of the nature and scope of the invention reference may now be had to the following detailed description thereof taken in connection with the accompanying drawings wherein.

Figure 1:
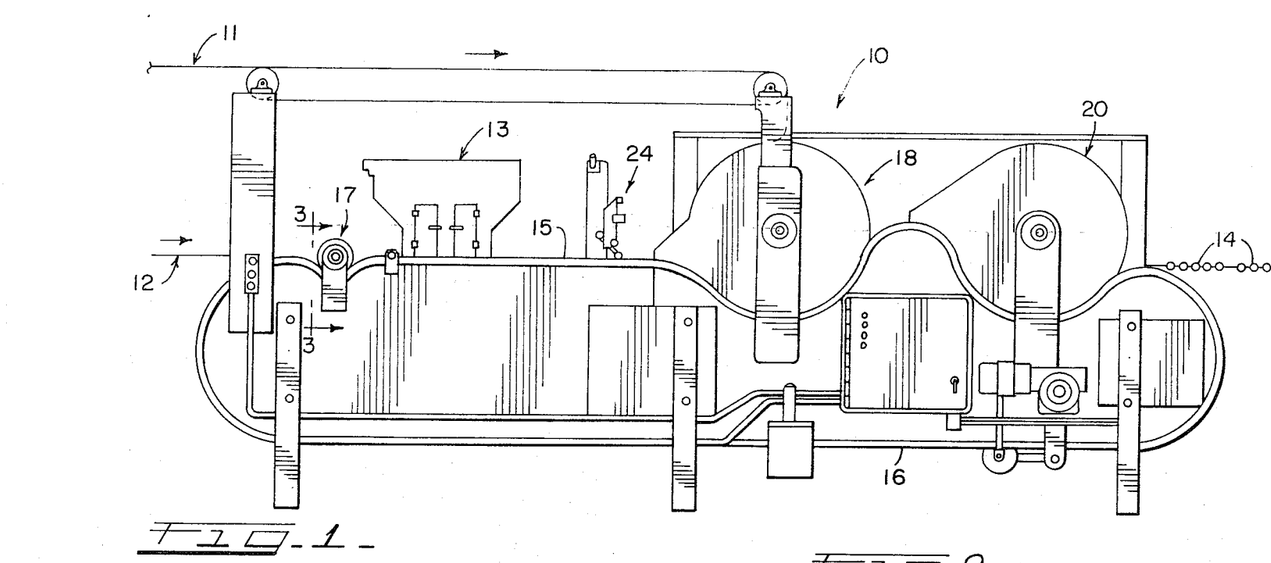
FIG. 1 is a side elevational view of packaging apparatus for continuously forming hermetically sealed envelopes around individual wieners or Smokie Links from upper and lower webs of packaging film with one embodiment of the present invention serving as one of the main units in the packaging apparatus.

Referring to FIG. 1, the packaging apparatus in its entirety is indicated generally at 10, being supplied with an upper web of packaging film 11 and a lower web 12 and individual wieners from a feeder indicated generally at 13 and discharging the wieners individually packaged in separate hermetically sealed and evacuated film envelopes in groups of five as indicated at 14—14.

The packaging film 11 and 12 may comprise laminates of polyvinylidinechloride co-polymers (i.e., saran) in the super-cooled (i.e., amorphous) condition as described for example in the above mentioned U.S. Pat. No. 3,189,505. Alternatively, the films 11 and 12 can be formed of other materials that can be rendered deformable and heat sealable for handling in the apparatus 10.

The apparatus 10 includes an endless chain of lower die plates (described hereinafter) extending from the head (i.e., left) end of the apparatus which receives the webs of packaging film 11 and 12 to the discharge end and has a generally horizontal upper run including side track structures 15—15, a lower return run track which is indicated at 16. At the head end of the apparatus 10 adjacent to the head end of the upper side tracks 15 a lower film press and suck-down unit is indicated generally at 17 and it is this unit of the apparatus, and its method of operation, with which the present invention is concerned.

In the mid-portion of the apparatus 10 a package-forming unit is indicated generally at 18 in which the upper web 11 of packaging film is sucked into the die cavities in a series of upper die plates which temporarily mate with the lower die plates previously loaded with wieners or the like so as to form individual evacuated and hermetically sealed packages or envelopes around each individual wiener. The individually packaged wieners progress from the package forming unit 18 to a package perforating and cut-out unit indicated generally at 20 wherein the packaged wieners are separated into the groups 14—14 containing any desired number, e.g., five, and the film material interconnecting individual wieners is perforated so that individual wieners in the envelopes 21—21 may be readily separated one at a time. The wiener feeder and loader unit 13, package-forming unit 18 and package cut-out unit 20 do not form a part of the present invention and will not be described in detail. However, in general these portions of the apparatus 10 may conform to the corresponding units of the packaging apparatus described and shown in the above-mentioned patents.

Figures 2, 9:
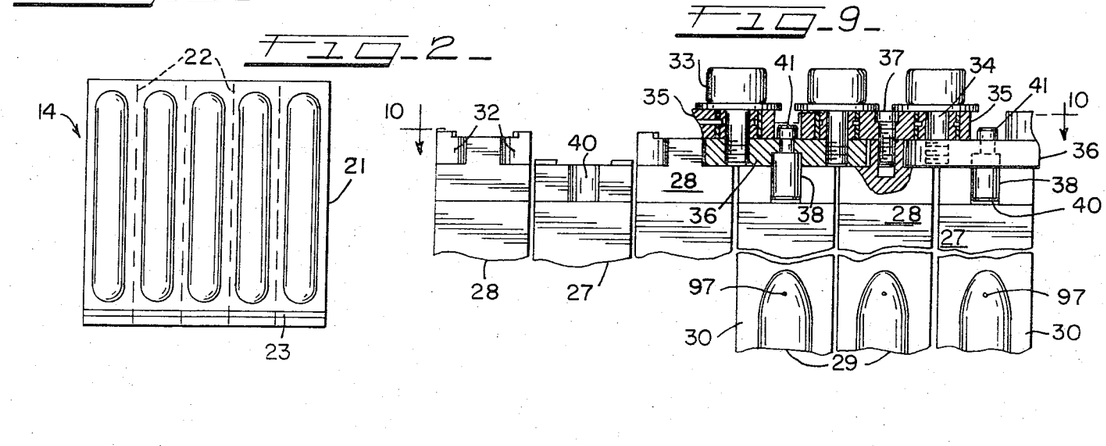
FIG. 2 is a plan view of a group of five wieners or Smokie Links individually packaged by the apparatus of FIG. 1 in hermetically sealed evacuated film envelopes which are detachable one from another.
FIG. 9 is a fragmentary detailed view taken on enlarged scale taken on line 9—9 of FIG. 4.
Figures 3, 5:
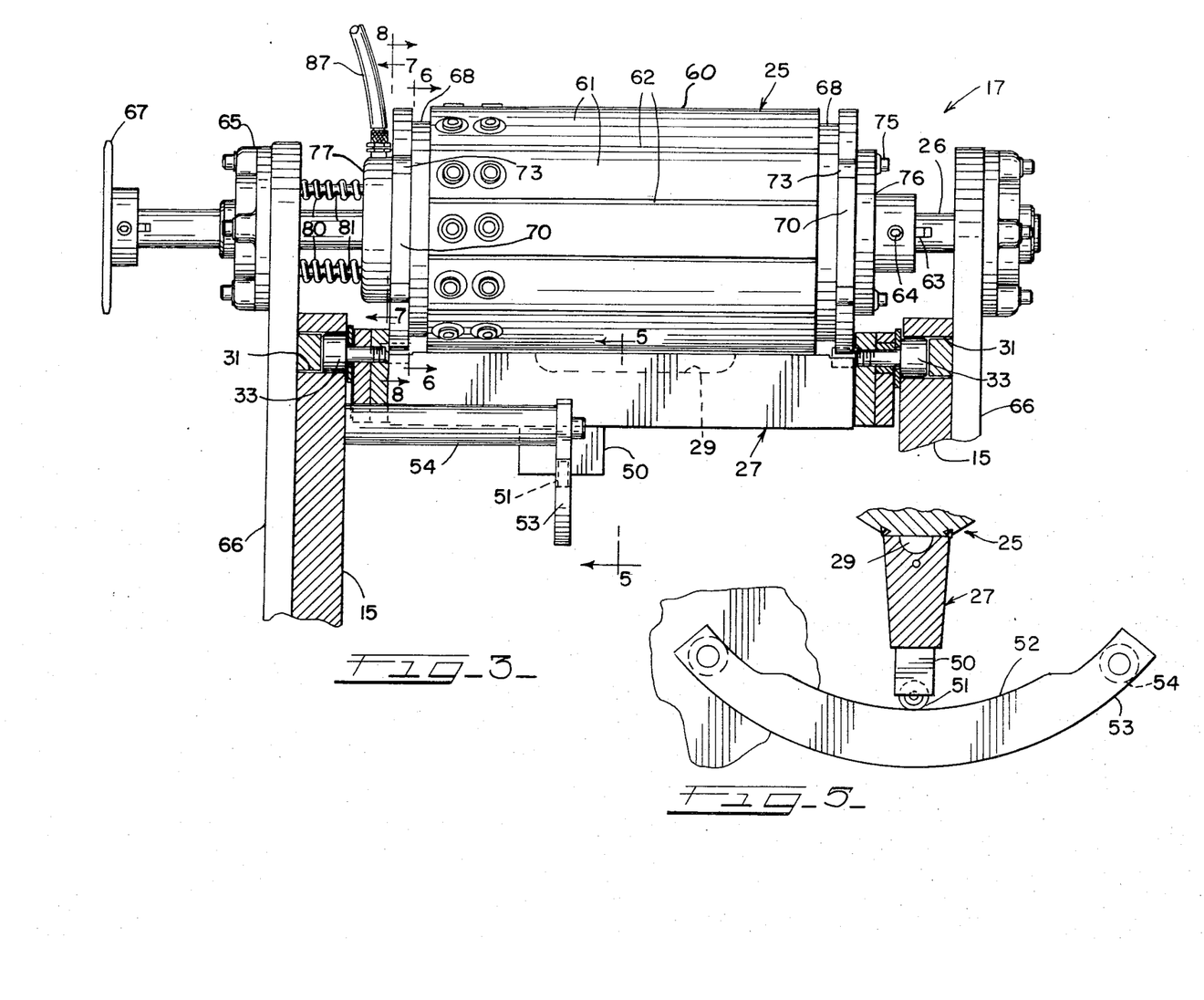
FIG. 3 is a magnified elevational view taken on line 3—3 of FIG. 1, partly broken away and in vertical section, showing the unit of the apparatus which comprises an embodiment of this invention, and comprising a flat sided roll and related mechanism for pressing a lower web of packaging film in deformable condition down onto the upper mating planar surface of a lower die plate and for drawing or sucking the film material into the die cavity in the mating surface of the lower die plate.
FIG. 5 is a fragmentary detail view partly in elevation and partly in section taken on line 5—5 of FIG. 3.
Figure 4:
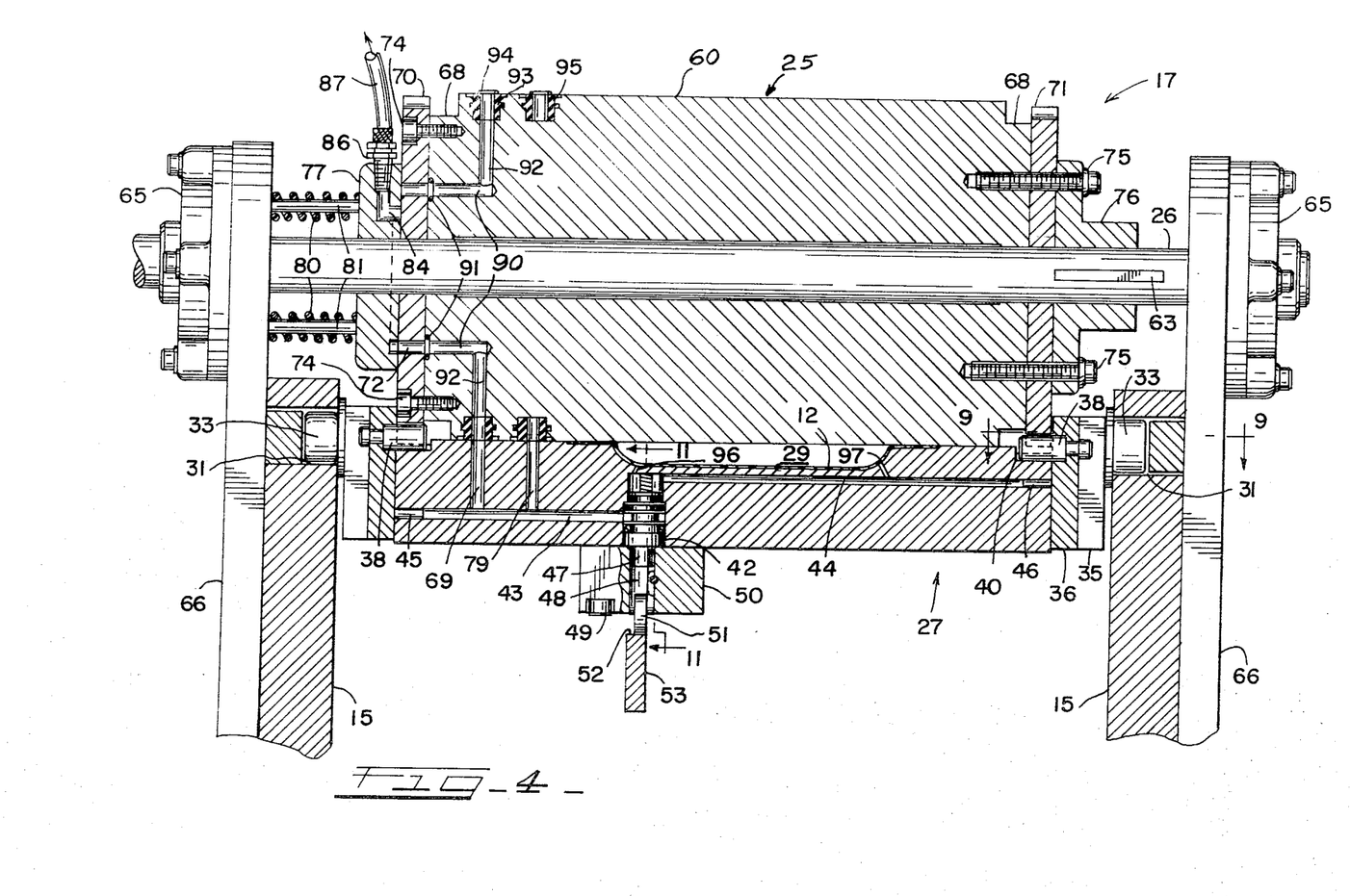
FIG. 4 is a vertical longitudinal sectional view through the mechanism shown in FIG. 3, certain parts being shown in elevation.
Figures 6, 7, 8:
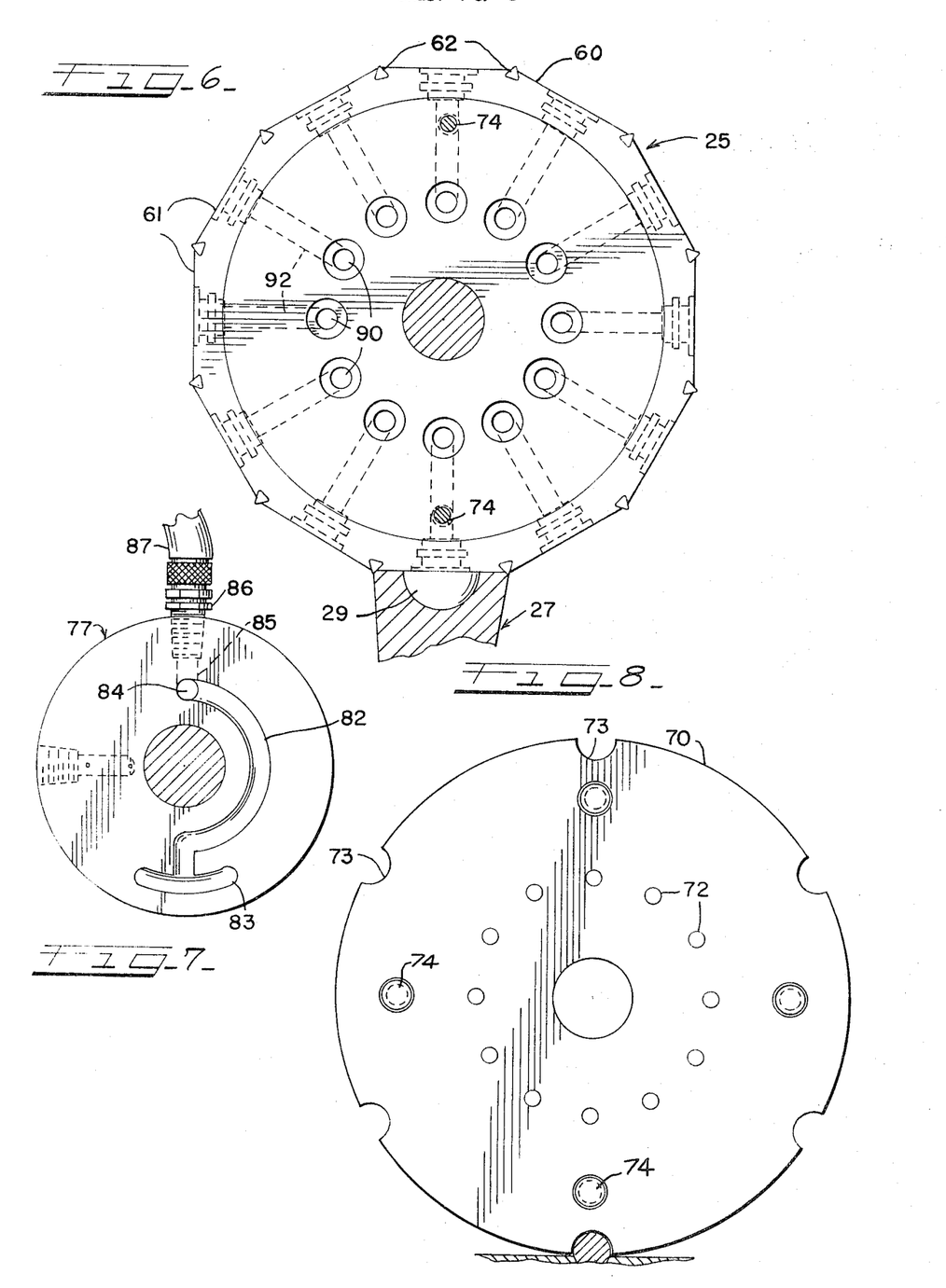
FIG. 6 is an elevational view taken on line 6—6 of FIG. 3.
FIG. 7 is an elevational view taken on line 7—7 of FIG. 3.
FIG. 8 is an elevational view taken on line 8—8 of FIG. 3.
Figure 10:
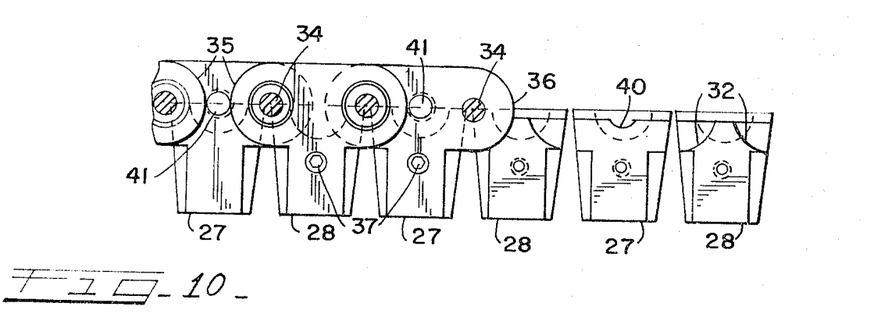
FIG. 10 is a view taken on line 10—10 of FIG. 9.
Figure 11:
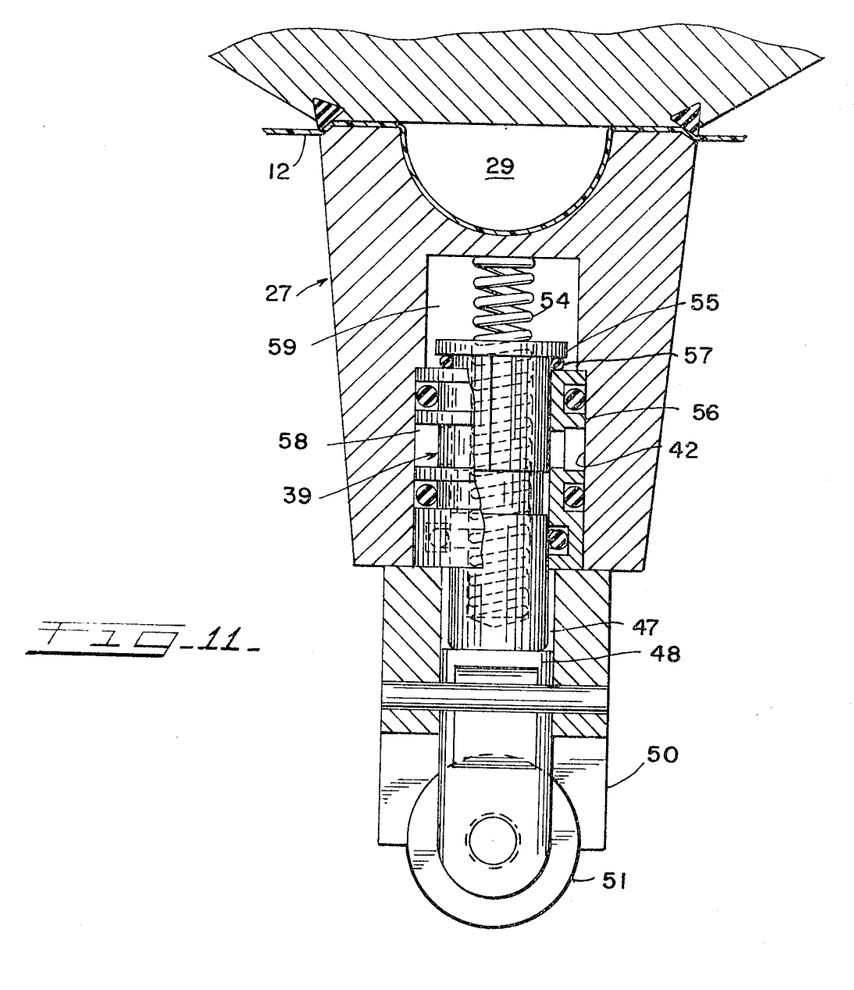
FIG. 11 is a vertical sectional view on enlarged scale taken on line 11—11 of FIG. 4.

In FIG. 2 one of the groups 14 of five packaged wieners is shown with the wieners being individually packaged in evacuated and hermetically sealed envelopes 21—21 each of which is interconnected to another so as to be detachable therefrom along a line of perforations 22. If desired, a tear strip 23 may be incorporated in known manner along one side of the package 14 so as to facilitate the opening of each individual envelope 21. The tape 23 when used is dispensed from a mechanism of known type indicated generally at 24 in FIG. 1.

Reference may now be had to FIGS. 3–11 for a detailed description of the lower film press and suck-down unit 17 in which the lower film 12 is pressed down onto the upper planar face or flat top surface of each lower die plate 27—27 and 28—28 (FIG. 9) and is deformed and sucked into the die cavities 29 in the central portion of each lower die plate. A principal element of the unit 17 is a twelve-sided roll 25 (FIG. 3) mounted for rotation on a shaft 26 to which it is suitably keyed. It will be noted that the axis of rotation of the roll 25 extends transversely to the direction of travel of the upper run of the chain of lower die plates 27, 28 one of which is indicated generally in FIGS. 3 and 4 in mating relationship with the flat side of roll 25 that is in the nadir position.

Each die plate 27 has the same construction as does each die plate 28 with each being primarily in the form of an elongated generally symmetrical block or bar having in the central portion of the upper face when occupying the upper run a die cavity 29 which takes the shape of the lower half of the article to be packaged, i.e., the lower half of a wiener or Smokie Link. Each die plate cavity 29 which takes the shape of the lower half of the article to be packaged, i.e., the lower half of a wiener or Smokie Link. Each die plate cavity 29 is framed by the upper planar surface 30 (FIG. 9) of each die plate 27 ro 28.

Referring to FIGS. 3, 4, 9 and 10, the front and back, inwardly opening cam tracks or guideways 31—31 for supporting and guiding the upper run of the continuous chain of alternating lower die plates 27 and 28 are provided along the tops of the side tracks 15—15 so as to extend along opposite sides of the apparatus 10. The cam tracks or guideways 31—31 receive therein support or cam follower rollers 33—33 which are mounted along the opposite ends of the lower die plates 27 and 28 so as to support the same. The rollers 33 have stub shafts 34 which project inwardly through outer links 35 with their inner ends being screwed into inner links 36. The links 35 and 36 are generally T-shaped with their horizontal cross portions overlapping. Recessed cap screws 37—37 extend through the lower vertical legs of the outer links 35 and are screwed into tapped holes provided therefor in the ends of the longer lower die plates 28 so as to thereby connect the chain assembly to the die plates. The ends of the die plates 28 are provided with arcuate recesses or pockets 32—32 contoured for receiving the arcuate ends of the inner links 36.

For the purpose of having the upper run of the continuous chain of lower die plates 27, 28 drive the roll 25 in proper mating relationship therewith hardened pins 38—38 are mounted on each of the inner links 36 at the opposite ends of the die plates 27 with the lower portion of each hardened pin 38 cradled in a recess 40 provided therefor, thereby leaving the upper half of each hardened pin 38 exposed for sprocket driving purposes (to be described). The outer ends of the pins 38 extend into counter-bored recesses on the inside of the inner links 36 and cap screws 41—41 serve to secure the hardened pins 38 to the inner links 36.

Each lower die plate 27 and 28 has a counterbored hole 42 (FIGS. 4 and 11) extending upwardly from the underside for receiving a valve mechanism 39 which serves to intermittently establish communication between a lower horizontal passageway 43 and an upper horizontal passageway 44 extending longitudinally into each die plate 27 and 28 from opposite ends thereof, and being suitably plugged as indicated at 45 and 46. The valve mechanism 39 in the vertical passage or opening 42 includes a vertically reciprocal valve stem 47 the lower end of which impinges on the upper end of a caster stem 48 carried in a block 50 secured to the underside of each die plate 27 and 28 by cap screws 49. Each caster 48 has a cam roller 51 for engaging the upper cam surface 52 of a stationary arcuate cam 53. The stationary cam 53 is mounted from its opposite ends on posts 54 (FIG. 3 and 5) projecting inwardly from one of the upper side tracks 15. The cam surface 52 is so shaped that each time a caster roller 51 carried under a die plate 27 or 28 passes over the mid-portion of the cam surface the valve mechanism 39 in the vertical passage or bore 42 is raised overcoming the hold-down force of a compression spring 54, and permitting communication to be temporarily established between the horizontal passageways 43 and 44 in the die plate 27 or 28.

The spring 54 is held under compression at all times with its upper end engaging the upper end of recess 42 and its lower end engaging the bottom end of the spring-receiving well in a valve member 55 which is vertically reciprocable in a valve spool 56. When the valve member 55 is lifted and unseated from the O-ring 57 a pathway is opened between annular recess 58 into which passageway 43 communicates and the space 59 above the valve member 55 into which passageway 44 communicates. The stem of the valve member 55 is flat-sided so as to provide four vertical paths between recesses 58 and 59 when the seal at O-ring 57 is temporarily broken.

Each lower die plate 27 and 28 is also provided with a pair of vertical passageways 69 and 79 (FIG. 4) which extend from its top planar surface 30 down to the lower horizontal passageway 43. The outboard vertical passageway 69 permits suction or vacuum to be applied to the horizontal passageway 43 when a lower die plate 27 or 28 mates underneath the flat side of the press and suck-down roller 25 which is in the nadir position as shown in FIGS. 3–6. The vertical passageway 79 is for the purpose of applying suction to the lower horizontal passageway 43 when a lower die plate 27 or 28 subsequently passes through the package-forming unit 18 (FIG. 1).

The construction of the press and suck-down roll 25 and its associated cooperating parts comprising the apparatus 17 will now be described. The main body or element of the roll assembly 25 consists of the member 60 which is symmetrical about its longitudinal and principal axis and which has twelve flat sides 61—61 in the form of elongated rectangles. Along each line of intersection between adjacent sides 61—61 a slot is formed which is truncated or dove-tailed in cross section so as to retain therein elongated hold-down strips 62—62 formed of resilient rubber-like material. These strips 62 serve to engage and temporarily anchor the lower packaging film 12 between a flat side 61 in its nadir position and the opposing or mating upper planar surface 30 of a lower die plate 27.

A key 63 secured in place by a set screw 64 (FIG. 3) serves to secure the roll member 60 to the support shaft so as to prevent relative rotation therebetween. The shaft 26 is journaled at opposite ends in bearing assemblies 65—65 mounted on the outboard sides of uprights 66—66. The shaft 26 on the left end as viewed in FIGS. 3 and 4 projects outwardly beyond its support bearing 65 and carries on the outer end a sprocket 67 which serves to drive certain elements of the packaging machine not directly related to the present invention or necessary to a complete understanding thereof.

The roll member 60 is turned down at its opposite ends as indicated at 68—68 and a circular drive plate 70 is bolted onto the left end of the member 60 while a similar drive plate 71 is bolted onto the right hand end. The rims of these drive plates 70 and 71 correspond but the drive plate 70 is provided with twelve transverse holes 72—72 (FIG. 8) arranged in a circle concentric with the center of the drive plate 70 whereas the right hand drive plate 71 need not have corresponding holes.

The rim or perimeter of the drive plates 70 and 71 are provided with six aligned semi-circular notches 73—73 for driven engagement with the upper exposed portions of the drive pins 38 (FIG. 4) carried on the opposite ends of the lower die plates 27. The left hand drive plate 70 is attached to its adjacent end of the roll member 60 by four cap screws 74 while the right hand drive plate 72 is secured to the right end by four cap screws 75—75 which also project through registering apertures in a hub member 76 which fits over the shaft 26.

At the left hand end of the press and suck-down roll unit 25 (as viewed in FIGS. 3 and 4) a stationary suction valve plate 77 fits against the outside face of the drive plate 70 and is pressed firmly thereagainst by a plurality of compression springs 80—80 which fit over support pins 81—81 extending between the outer face of the valve plate 77 and the inner face of the adjacent upright 66. It will be noted that the valve plate 77 is centrally apertured so that the axle or shaft 26 projects therethrough. On its inner face (FIG. 7) the suction valve plate 77 is provided with a semi-circular groove 82 which at its lower end communicates with a relatively short arcuate groove 83 which is concentric with the center of the plate 77. At its upper end the groove 82 communicates with a bore 84 which in turn communicates with a radial bore 85 the outer end of which is tapped so as to receive a threaded nipple 86 secured onto the end of a flexible hose 87 leading to a source of vacuum.

Each of the twelve holes 72 through the left hand drive plate 70 registers with a horizontal passageway 90 drilled in the end of the roll member 60 and counter-bored at its outer end to receive one of the O-rings 91—91. At their inner ends each of the passageways 90 communicates with a radial passageway 92 leading to one of the twelve flat sides 61. Each passageway 92 is counter-bored adjacent its outer ends so as to receive and retain therein a resilient grommet 93 having an annular portion 94 at the center which protrudes slightly beyond the surface of the flat side 61. Aligned with and inboard of each grommet 93 is a grommet 95 retained in a dead-end hole. When a flat side 61 is in its nadir position, its grommet 95 seals off the end of the vertical passageway 79 (FIG. 4) in the mating lower die plate 27 or 28 while the companion grommet 93 provides a temporary seal between the adjacent ends of the passageways 92 and 69.

The mode of operation of the lower film press and suck-down unit 17 will now be described in connection with FIGS. 3–11. The endless chain of alternating lower die plates 27 and 28 will be suitably driven in known manner so that each lower die plate 27 and 28 will in turn pass under the film press and suck-down roll 25. In doing so the upper exposed portions of the drive pins 38—38 on opposite ends of the lower die plates 27 will engage in the semi-circular notches 73—73 in the drive plates 70 and 71 thereby rotating the roll member 60 and the components secured thereto in a counter-clockwise direction, as viewed in FIGS. 6 and 7.

As each flat side 61 of the roll member 60 approaches its nadir position its leading film-engaging strip 62 will engage the lower packaging film 12 and commence to press the film down against the approaching leading edge of one of the lower die plates 27 or 28. When the flat side 61 reaches its full nadir position its trailing resilient strip 62 will also press the lower packaging film 12 down against the trailing edge of the lower die plate 27 or 28 mating therewith. As previously described, as a lower die plate 27 or 28 mates with one of the flat sides 61 in the nadir position the valve mechanism 39 carried in the block 50 on the underside thereof is actuated by the caster or roller 51 passing over the cam 53 so as to establish temporary communication between the horizontal passageways 43 and 44 in the die plate 27 or 28. The vacuum that is continuously applied to the flexible conduit 87 will now have an open path to the die cavity 29 in the mating die plate 27 or 28. This open path includes the nipple 86, radial passageway 85, horizontal passageway 84, semi-circular groove 82, arcuate groove 83, registering hole 72, registering horizontal passageway 90, radial passageway 92, vertical passageway 69, horizontal passageway 43, vertical bore 42, horizontal passageway 44 and small diameter passageways 96 and 97 (FIGS. 4 and 9) at opposite ends of the die cavity 29.

The vacuum thus applied on the underside of the lower packaging film 12 overlying and pressed down on the planar surface 30 surface the die cavity 29 in combination with the atmospheric pressure will cause the film over the cavity to suck down therein and conform accurately to the interior surface of the die cavity 29 since the film is in a deformable condition. The lateral margins of the film surrounding the die cavity 29 will be pressed flatwise against the planar surface 30 of the die plate 27 or 28 by the mating flat side 61 of the roll member 60 and the strips 62. Once the vacuum is established underneath the film 12 the margins of the film will be effectively held down even after the lower die plate 27 or 28 passes from underneath the press and suck-down roll 25 as the vacuum is retained since the valve mechanism 39 will be actuated by spring 54 to close off communications between the passageways 43 and 44 as the lower die plate 27 or 28 passes from underneath the mating flat side 61 and cam wheel 51 leaves the cam 53.

After leaving the film press and suck-down unit 17 each lower die plate 27 or 28 receives a wiener in its film-lined die cavity 29 as it passes through the wiener feeding unit 13. Thereafter each lower die plate 27 or 28 passes through the package-forming unit 18 and the package perforating and cut-out unit 20 as above described to form the packages 14.

While the film press and suck-down unit 17 is useful in the apparatus 10, it will be appreciated that it has other utility. For example, the die cavities 29 in the die plates 27 and 28 could be shaped to be filled with jelly or honey, and then covered with a flat film which would be heat sealed thereto around each die cavity or pocket.

What is claimed as new is:

1. In apparatus for packaging individual articles or quantities of a material at least in part in cavities formed in a web of packaging film that is at least temporarily in deformable condition, in combination, an endless chain of die plates having a generally horizontal upper run and which die plates when moving in said generally horizontal upper run have upwardly opening article-receiving cavities therein with each surrounded by a generally planar surface for mating temporarily with a superposed planar surface, each of said die plates having a passageway therein communicating between a suction opening in its said planar surface and the interior of said cavity therein, and means cooperating with each of said die plates to deform said lower web of film into the cavity therein and press said lower web of film down onto the generally planar surface surrounding said cavity, said means comprising: roll means mounted for rotation above and adjacent to the head end of said upper run with the axis of rotation thereof being horizontal and extending transversely to the direction of travel of said upper run, the longitudinal surface of said roll means having a plurality of elongated flat sides each of which in its nadir position constitutes a superposed planar surface that mates temporarily with the planar surface of one of said die plates, each of said flat sides having an opening therein which registers in sealed communication with the suction opening in the mating die plate planar surface, said roll means having passageways therein equal in number to said elongated flat sides thereon with each passageway communicating at one end with the opening in one of said flat sides and at the other end with an opening in one end of said roll means with said end openings being arranged in a circle concentric with said axis of rotation, and a stationary suction plate mating over said one end of said roll means and having a passageway therein providing communication between an exterior suction connection and each of said end openings as said end openings have temporary communication with the suction opening in the planar surface of one of said elongated lower die plates.

2. In the apparatus of claim 1 said articles to be packaged being elongated and said die plates and article-receiving cavities therein being elongated transversely to the direction of said upper run.

3. In the apparatus of claim 1 said articles to be packaged being small sausages, said die plates being elongated transversely to the direction of said upper run and said article-receiving cavities conforming to the lower half of a horizontally extending small sausage to be packaged.

4. In apparatus for packaging articles between upper and lower webs of packaging film at least the lower web being in deformable condition said apparatus including an endless chain of lower die plates which when in the upper generally horizontal run of said chain have upwardly opening article-receiving cavities therein surrounded by generally planar surfaces for mating temporarily with the lower planar surfaces of upper die plates, each of said lower die plates having a passageway therein communicating between a suction opening in its said planar surface and the interior of said cavity therein, means cooperating with each of said lower die plates to deform said lower web of film into the cavity therein and press said lower web of film down onto the generally planar surface surrounding said cavity, comprising: a roll mounted above and adjacent to the head end of said upper run with its axis of rotation extending transversely to the direction of travel of said upper run, the longitudinal surface of said roll being formed of a plurality of elongated flat sides each of which in its nadir position mates with the planar surface of one of said lower die plates, each of said flat sides having an opening therein which registers in sealed communication with the suction opening in the mating planar surface, said roll having passageways therein equal in number to said elongated flat sides thereon with each passageway communicating at one end with the pening in one of said flat sides and at the other end with an opening in one end of said roll with said end openings being arranged in a circle concentric with said axis of rotation, at least one drive plate mounted flatwise against one end of said roll and having formations in the periphery thereof for driving engagement with driving elements along one side of said chain of lower die plates, said drive plate when on the end of said roll having said end openings, and stationary suction plate means mating over said roll end having said end openings therein or over said drive plate having said registering openings therein, said suction plate having a passageway therein providing communication between an exterior suction connection and each of said end openings or drive plate registering openings as said end openings or registering openings temporarily have communication with the suction opening in the planar surface of one of said elongated lower die plates.

5. In the apparatus of claim 4, each of said lower die plates having valve means normally closing said passageway therein communicating between a suction opening in its planar surface and the interior of said cavity therein, said valve means being actuatable to temporarily open said passageway and having a cam roller which upon engaging a cam surface actuates said valve means, and a stationary cam providing said cam surface so as to be engaged by each cam roller when said planar surface of the lower die plate has mating engagement with one of said flat sides of said roll in its nadir position.

6. In the apparatus of claim 4, one half of said lower die plates being longer than the other half with the longer lower die plates being identical, the shorter lower die plates being identical, and said longer and shorter lower die plates alternating in said chain each of said shorter lower die plates being provided on each end with one of a plurality of first links having laterally projecting ends extending into pockets provided therefor in the ends of the adjacent longer lower die plates, each of said longer lower die plates being provided on each end with one of a plurality of second links having laterally projecting ends each of which overlaps a laterally projecting end on one of said first links, support rollers for said chain of lower die plates mounted on said projecting ends of said second links, and roll driving pins secured on each end of said shorter lower die plates with approximately half of each pin cradled in a semi-cylindrical recess provided therefor in each end of said shorter lower die plates and with the upper half of each roll driving pin being exposed above the top of the end of its shorter lower die plate, there being one of said drive plates secured on each opposite end of said roll and said formations in the peripheries of said drive plates being semi-circular recesses for mating driving engagement with said exposed upper halfs of said driving pins.

* * * * *